United States Patent [19]
Watanabe et al.

[11] Patent Number: 5,635,006
[45] Date of Patent: Jun. 3, 1997

[54] PATTERN FORMING METHOD AND INK COMPOSTION

[75] Inventors: Hirotoshi Watanabe, Osaka; Yutaka Nishimura, Kadoma; Koji Matsuo, Neyagawa; Noboru Aikawa, Ibaraki; Masahide Tsukamoto, Nara, all of Japan

[73] Assignee: Matsushita Electric Industrial Co., Ltd., Japan

[21] Appl. No.: 540,622

[22] Filed: Jun. 19, 1990

[30] Foreign Application Priority Data

Jun. 19, 1989 [JP] Japan ..................... 1-156513
Mar. 1, 1990 [JP] Japan ..................... 2-49743

[51] Int. Cl.$^6$ ..................................... B05D 5/00
[52] U.S. Cl. ................. 156/240; 101/154; 427/68
[58] Field of Search .................. 118/212; 156/230, 156/238, 240; 427/68; 101/150, 154, DIG. 43

[56] References Cited

U.S. PATENT DOCUMENTS 4,209,551  6/1980  Masaki et al. ..................... 427/68
4,732,828  3/1988  Sagou et al. ..................... 427/71 X

FOREIGN PATENT DOCUMENTS 55-41671  10/1980  Japan .
55-46674  11/1980  Japan .
56-33820  8/1981  Japan .

Primary Examiner—James Engel
Attorney, Agent, or Firm—Wenderoth, Lind & Ponack

[57] ABSTRACT

The fine-line pattern forming method is to form a pattern by transferring the pattern formed on the blanket of which surface is covered with an elastic material mainly composed of silicone resin, on a substrate on which a tack layer is formed. As an example thereof, the forming method of cathode-ray tube anode comprises a step of filling the groove of an intaglio with a graphite ink, a step of transferring the graphite ink in the groove of the intaglio on a blanket of which surface is covered with an elastic material mainly composed of silicone resin, a step of forming a tack layer on a substrate, a step of transferring and printing the pattern transferred on the blanket onto the substrate, a step of filling the groove of the intaglio with a phosphor ink, a step of transferring the ink in the groove of the intaglio on the blanket of which surface is covered with an elastic material mainly composed of silicone resin, a step of forming a tack layer on the substrate, a step of transferring and printing the pattern transferred on the blanket on the substrate on which the graphite pattern has been formed, a step of transferring an aluminum thin film possessing multiple pores as a metal-backed layer so as to cover a black matrix and a phosphor layer, and a step of firing the substrate covered with the aluminum thin film. The graphite ink comprises graphite powder, vehicle containing depolymerization type organic binder, and organic acid metal salt. The phosphor ink comprises phosphor powder and vehicle containing polymerization type organic binder.

18 Claims, 4 Drawing Sheets

PATTERN FORMING METHOD AND INK COMPOSTION

BACKGROUND OF THE INVENTION

1. Field of the Invention

The present invention relates to a pattern forming method for forming fine-line patterns, and an ink composition, and more particularly to a forming method suitable forming a cathode-ray tube anode, and graphite ink and phosphor ink used in cathode-ray tube or plasma display.

2. Description of the Prior Art

In the conventional cathode-ray tube anode process of color television manufacture, the surface of the glass substrate composing the phosphor plane was properly treated, and patterned, exposed and developed in a polyvinyl alcohol-ammonium dichromate photosensitive fluid, then a black substance such as graphite was rolled on the developed pattern, and the black matrix was formed by peeling and processing. The phosphor patterning was a complicated process to form each layer of R, G, B after three repeated sequences of spreading, drying, exposing, developing and drying of the slurry having the phosphor pigment dispersed in the polyvinyl alcohol-ammonium dichromate photosensitive fluid. In addition, before forming the metal-backed layer, an organic film layer was formed on the phosphor film as an interlayer, and the metal-backed layer was subjected to vacuum deposition. Afterwards, the glass substrate was fired at about 450° C. and formed.

The above cathode-ray tube anode forming process is very long and complicated in procedure, and requires a huge volume of water owing to wet process, and discharges much waste water containing public nuisance materials. Besides, regarding the precision of the pattern formed by wet process, since exposure and development were repeated, edge linearity, lack of hiding, lack and other defects occurred, and it was difficult to obtain patterns of high quality. Still worse, it required an enormous plant investment because of vacuum deposition of the metal-backed layer.

Recently, meanwhile, the development of liquid crystal color panel is intensive. The color filter used in this liquid crystal color panel is formed mostly by the technology of photolithography, and the process was very long, including the steps of color film forming, photoresist film forming, exposing and developing, and the yield was very low and the product was hence very expensive.

To eliminate such defects, various printing methods, that is, dry processes have been proposed. For example, as the ink composition for forming cathode-ray tube anode by screen printing or offset printing, a composition containing acrylic resin was disclosed in the Japanese Patent Publication No. 55-41671, but it was not commercially established yet. The reason is, among others, that a relatively large film thickness is required for the black matrix and the phosphor pattern while very fine-line patterns are needed. To add to the film thickness, the density of the ink layer must be raised, which forces to raise the ratio of the pigment component in the ink higher than in the ordinary composition. As a result, however, the printability is extremely impaired, and it is difficult to satisfy the desired pattern precision. Or when the pigment content in the ink is lowered in consideration of printability, the luminance is lowered and other adverse effects are brought about. In other words, in the screen printing intended to print very fine-line patterns of thick film on a glass substrate, the precision is not sufficient, and satisfactory printing is not possible even by the gravure offset printing. Or in the graphite paste for black color printing using only acrylic resin, the adhesion strength to the glass surface was poor, the exfoliation of black matrix and phosphor layer was noted.

SUMMARY OF THE INVENTION

The invention is hence intended to solve the above-discussed problems, by transferring the pattern formed on a blanket of which surface is coated with an elastic material mainly composed of silicone resin, on a substrate on which a tack layer is formed, thereby forming the pattern.

It is another object of the invention, which employs the offset printing for obtaining patterns of high quality, excellent in the linearity of edge and less in the occurrence of lack of hiding, lack or other defects, to present graphite ink and phosphor ink suited to this printing method, excellent in the scattering performance of organic binder even when the black matrix and the phosphor layer are coated with a thin aluminum film having multiple holes as the metal-backed layer after printing, capable of preventing lowering of degree of vacuum caused by deterioration of the scattering performance, strong in adhesion with the glass surface, and also capable of preventing exfoliation of the black matrix and phosphor layer, and moreover a forming method of cathode-ray tube anode for mass production of cathode-ray tubes using these inks.

It is an other object of the invention to present a forming method of color filter of high quality, excellent in the linearity of edge, and less in the occurrence of lack of hiding, lack or other defects.

The graphite ink of the invention comprises graphite powder, vehicle containing depolymerization type organic binder, and organic acid metal salt. The organic binder of the graphite ink is a resin composed of at least one of poly-α-methyl styrene, poly-isobutyl methacrylate, polymethyl methacrylate, and poly-4-fluoroethylene. The weight average molecular weight of the organic binder is 100,000 to 1,000 or preferably 10,000 to 1,000. The organic acid metal salt comprises at least one of silicon octoate, aluminum octoate, tin octoate, and zinc octoate, or at least one of silicon neodecanoate, aluminum neodecanoate, tin neodecanoate and zinc neodecanoate. The content of the organic acid metal salt is preferably 10 to 2 wt. %, and most preferably 6 to 2 wt. %.

The phosphor ink of the invention comprises phosphor powder and vehicle containing depolymerization type organic binder. The organic binder of the phosphor ink is a resin composed of at least one of poly-α-methyl styrene, poly-isobutyl methacrylate, polymethyl methacrylate and poly-4-fluoroethylene. The weight average molecular weight of the organic binder is 100,000 to 1,000, or preferably 40,000 to 1,000. The organic solvent in the ink comprises at least one of α-terpineol, n-butylcarbitol, n-butylcarbitol acetate, 2,2,4-trimethyl-1,3-hydroxypentyl-iso-butylate, linseed oil, and ethylene glycol monophenyl ether. Considering the linearity of print pattern, the content of this organic solvent is preferably 12:10 to 16:10 by weight to the graphite powder content in the graphite ink, and 1.5:10 to 3.0:10 by weight to the phosphor powder content in the phosphor ink.

The forming method of cathode-ray tube anode of the invention comprises a step of filling the groove of the intaglio with graphite ink, a step of transferring the graphite ink in the groove of the intaglio onto the blanket of which surface is coated with an elastic material mainly composed of silicone resin, a step of forming a tack layer on the substrate, a step of transferring and printing the pattern transferred on the blanket onto the substrate, a step of filling the groove of the intaglio with phosphor ink, a step of transferring the ink in the groove of the intaglio onto the blanket of which surface is coated with an elastic material mainly composed of silicone resin, a step of forming a tack layer on the substrate, a step of transferring the pattern transferred on the blanket onto a substrate on which graphite pattern has been formed, a step of transferring an aluminum thin film possessing multiple holes so as to cover the black matrix and phosphor layer as metal-backed layer, and a step of firing the substrate covered with the aluminum thin film.

In the constitution of the invention as described herein, the ink characteristics such as fluidity and tackiness necessary for transfer from blanket to substrate are not limited, and a wide range of materials may be used as the pattern forming material. That is, very fine-line thick film patterns may be formed easily on the substrate, and when this method is employed in formation of phosphor plane for CRT or plasma display, very fine-line graphite pattern and phosphor pattern may be easily formed on the substrate. This method is also free from problems experienced in the conventional wet process, that is, use of large volume of water and discharge of waste water containing public nuisance materials. Still more, vacuum deposition is not needed. Therefore, the manufacturing cost may be reduced greatly. From the viewpoint of precision, patterns of high quality are obtained. Furthermore, the black matrix and phosphor layer strong in the adhesive strength with the glass surface are formed, and a cathode-ray tube of high reliability may be presented.

It is also effective to apply in formation of color filters and pattern formation of circuit substrates.

As clear from the description herein, the invention is characterized by formation of fine-line thick film patterns by transferring the patterns formed on the blanket of which surface is coated with an elastic material mainly composed of silicone resin onto a substrate on which a tack layer is formed. By simplifying the process, the cost may be notably reduced. When this technique is applied in cathode-ray tube, plasma display or other phosphor products, or liquid crystal color filter and other pattern products, inexpensive products of high quality may be obtained without requiring any large manufacturing equipment.

The invention also features a graphite ink comprising graphite powder, vehicle containing depolymerization type organic binder and organic acid metal salt, a phosphor ink composed of phosphor powder and vehicle containing depolymerization type organic binder, and formation of print pattern by offset printing by using said graphite ink and phosphor ink. Moreover, by using the graphite ink and phosphor ink, instead of the vacuum deposition process of the metal-backed layer, it is possible to fire after transferring and forming before firing the aluminum thin film possessing multiple pores, so that the process may be further simplified. The cost reduction rate may reach up to 1/10, and when this method is applied in pattern products such as cathode-ray tubes, plasma displays and phosphor products, products of high quality may be obtained at low cost without requiring large manufacturing facilities. In addition, the black matrix and phosphor layer strong in adhesive strength to the glass surface are formed, and cathode-ray tubes of high reliability may be presented.

DESCRIPTION OF THE PREFERRED EMBODIMENTS

Figure 1:
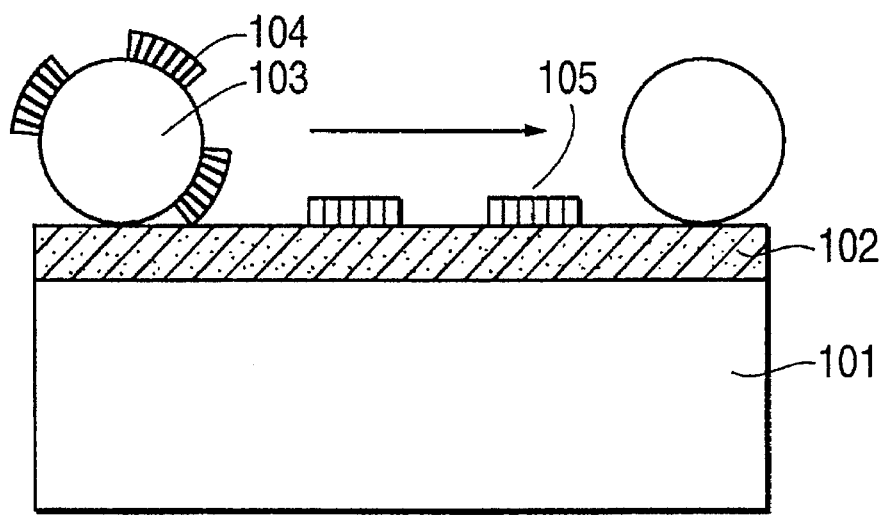
FIG. 1 is an explanatory drawing of pattern forming method of the invention.

Referring now to the drawings, an embodiment of the pattern forming method of the invention is described in detail below. FIG. 1 is an explanatory drawing of the pattern forming method of the invention. In FIG. 1, numeral 101 is a substrate. Numeral 102 is a tack layer formed in order to enhance the printability when forming patterns, which may be either a tacky adhesive material at ordinary temperature or a thermoplastic resin to be used in tacky adhesive state by heating and melting. Or by using a tacky adhesive material which is cured by ultraviolet rays, the pattern of a specific part may be solidified. Numeral 103 is a blanket of which surface is coated with a rubber-like elastic body with a favorable parting property, and among silicone resins, fluoroplastics and polyethylene resins, what is preferably used in an elastic material with JIS rubber hardness of 30 to 60 degrees, mainly composed of silicone resin, having the surface covered in a thickness of about 5 mm. Numeral 104 is a pattern formed on the blanket, in which ink is dropped into the gravure intaglio, the entire surface of the gravure intaglio is scraped by a scraper to leave the ink only in the groove, and the blanket is pressed against the surface to transfer the pattern. Numeral 105 is a desired pattern obtained by pressing and transferring the pattern on the blanket onto the substrate on which the tack layer has been formed. The pattern 104 on the blanket may be formed by using a letterpress or by screen printing, as well as by transfer from the intaglio.

Figure 2:
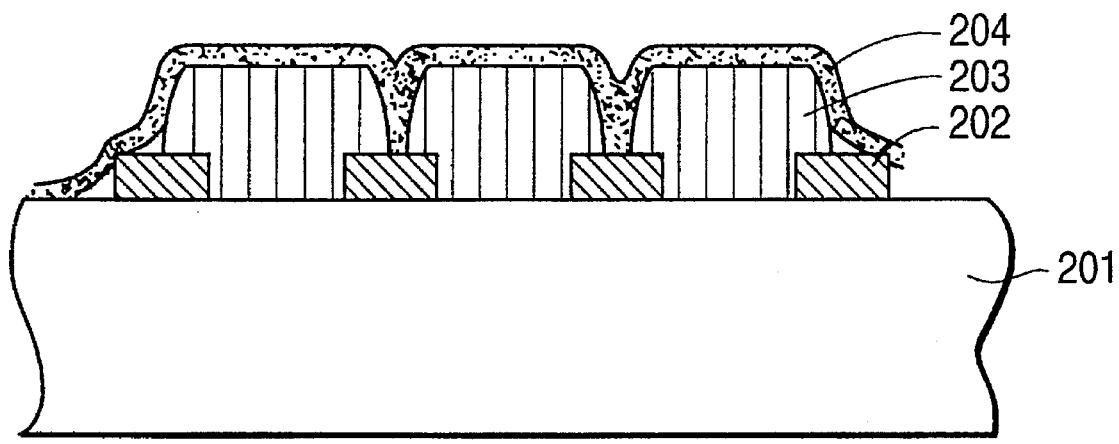
FIG. 2 is a sectional view of a color cathode-ray tube anode.

As a product requiring pattern (hereinafter called a pattern product), an example of anode formation of color cathode-ray tube is presented and embodiments of graphite ink, phosphor ink and forming method of cathode-ray tube anode of the invention are described below while referring to the accompanying drawings. FIG. 2 is a sectional view of a color cathode-ray tube anode, in which a black matrix 202 made of a black substance and a phosphor layer 203 are formed inside a glass-made face plate 201, and a metal-backed layer 204 is disposed. The metal-backed layer 204 is intended to enhance the luminance by reflecting the light emitted from the phosphor plane by the mirror action of the metal film. In the invention, instead of vacuum deposition, the aluminum thin film having multiple pores is transferred and formed before firing.

EXAMPLE 1

Using a three roll mill, the mill base in the composition specified below was passed six times to mix, and a graphite ink for black stripe was prepared. At this time, the resin was preliminarily stirred and dissolved in the solvent.

| | |
|---|---|
| Graphite (Hitachi Powder Metal Co., GP-60S) Mean particle size 0.4 μm | 26 (parts by weight) |
| i-BMA, α-MeSt resin (Sekisui Chemical Co., IBS-6) Weight average molecular weight 4750 | 34 |
| Solvent (Kanto Chemical Co., n-butylcarbitol acetate) | 34 |
| Adhesive agent (silicon octoate) | 3 |
| Dispersing agent (Toho Chemical Co., Dispant EN-120A) | 3 |

The one-minute flow value of the prepared ink on a spread meter was 13 mm, and by using this graphite ink, a stripe of 65 μm in width and 4 μm in height was printed on a glass plate. The printing method is shown below. The tacky adhesive material (isodecylmethacrylate, glass transition point −60° C., 30% toluene solution) was applied on the glass plate by spin coating in a thickness of 2 μm, and dried to obtain the transfer object. The tacky adhesive material should be preferably a material that is adhesive at ordinary temperature and is completely pyrolyzed in the binder removal process at the final step, and an acrylic resin with the glass transition point of 40° C. or less was favorable. The intaglio was a stainless steel plate having stripe etching of 70 μm in width and 15 μm in depth, and the graphite ink was dropped on the intaglio, and the whole surface of the intaglio was scraped off by a ceramic scraper to leave the graphite ink only in a groove of the intaglio, and the blanket having the surface coated with silicone rubber (JIS rubber hardness 35 degrees) in a thickness of 5 mm was pressed and rotated to transfer the pattern on the transfer object. The obtained pattern was excellent in linearity, and had a high quality, being free from lack of hiding, lack or other defects.

If the hardness of the silicone rubber covering the surface of the blanket is very low (less than 10 degrees) such as in the case of Pad printing, the deformation of the rubber-like elastic material becomes very large, and the intaglio pattern cannot be reproduced reliably, or if the hardness is too high, the contact between the blanket and ink is poor, and the pattern cannot be reproduced reliably, too. Hence, the proper hardness of the elastic material for covering the surface was 30 degrees or more as the JIS rubber hardness, and preferably in a range of 35 to 60 degrees.

Next, using a ceramic three roll mill, the mill base of the following composition was passed six times to mix, and a phosphor ink was prepared. The resin was, same as in the case of graphite ink, preliminarily stirred and dissolved in the solvent.

| | |
|---|---|
| Green phosphor (ZnS:Cu, Al) Mean particle size 5.2 μm | 73 (parts by weight) |
| i-BMA, MMA, α-MeSt resin (Sekisui, IBM7L-3) Weight average molecular weight 32070 | 10 |
| Solvent (Kanto, α-terpineol) | 15 |
| Dispersing agent (Toho, Dispant EN-120A) | 2 |

Similarly, using $Y_2O_2S$:Eu as red luminescent phosphor, and ZnS:Ag as blue luminescent phosphor, red phosphor ink and blue phosphor ink were prepared. As the intaglio, a stainless steel etching plate of 145 μm in width and 40 μm in depth was used, and a green phosphor pattern was printed on a glass plate in a same gravure offset method as in the preceding example. Sequentially, the red phosphor ink and blue phosphor ink were printed in specified positions, and a three-color phosphor pattern of red, green and blue was obtained. The printed pattern satisfied all of stripe uniformity, linearity and film thickness precision.

As the metal-backed layer, in the next step, multiple fine pores were opened in an aluminum thin film of 1500 angstroms in thickness being evaporated on a polyethyleneterephthalate (PET) film, and it was pressed with a pressure of 3 $kg/mm^2$ and was transferred on the black matrix and phosphor pattern. When this substrate was fired at 450° C., the organic matter was burnt out, and a sufficient optical characterization was obtained as the color cathode-ray tube anode.

EXAMPLE 2

Using a three roll mill, the mill base of the following composition was passed six times to mix, and a graphite ink for black stripe was prepared in the same procedure as in Example 1.

| | |
|---|---|
| Graphite (Hitachi Powder Metal Co., GP-60S) Mean particle size 0.4 μm | 24 (parts by weight) |
| i-BMA, α-MeSt resin (Sekisui Chemical Co., IBS-6) Weight average molecular weight 4750 | 32 |
| Solvent (Kanto Chemical Co., n-butylcarbitol acetate) | 32 |
| Adhesive agent (silicon octoate) | 5 |
| Dispersing agent (Toho Chemical Co., Dispant EN-120A) | 3 |
| Linseed oil | 4 |

An acrylic tacky adhesive material with the glass transition point of −2° C. (a copolymer of isobutylmethacrylate and glycidyl methacrylate) was applied on a glass substrate and dried, and a tack layer of 3 μm was formed. Using the ink for black stripe in the above composition, a black stripe pattern was printed on the glass substrate on which the tack layer is formed, in the printing conditions of intaglio (60 μm in width, 20 μm in depth) and blanket (rubber hardness 45 degrees, silicone rubber, rubber thickness 6 mm). The printed black stripe pattern was 55 μm in width and 5 μm in thickness, and a favorable linearity was confirmed.

Consequently, same as in Example 1, using a ceramic three roll mill, the mill base of the following composition was passed six times to mix, and a phosphor ink was prepared.

| | |
|---|---|
| Blue phosphor (ZnS:Ag) Mean particle size 5.2 μm With cobalt blue pigment | 73 (parts by weight) |
| i-BMA, α-MeSt resin (Sekisui, IBS-3) Weight average molecular weight 98300 | 10 |
| Solvent (Kanto, α-terpineol) | 15 |
| Dispersing agent (Toho, Dispant EN-120A) | 2 |

Likewise, using $Y_2O_2S$:Eu phosphor as red luminescent phosphor and ZnS:Ag as blue luminescent phosphor, a red phosphor ink and a blue phosphor ink were prepared. As the intaglio, a stainless steel etching plate of 145 in width and 40 μm in depth was used, and the green phosphor pattern was printed on the glass plate by the same offset gravure method as in Example 1. Successively, the red phosphor ink and blue phosphor ink were printed at specified positions, and a three-color phosphor pattern of red, green and blue was obtained. The printed pattern satisfied all of the stripe uniformity, linearity and film thickness precision.

Next, as the metal-backed layer, multiple fine pores were opened in an aluminum thin film of 1500 angstroms in thickness evaporated on a PET film, and it was pressed with a pressure of 3 kg/mm$^2$ to transfer on the black matrix and phosphor pattern. This substrate was fired at 450° C., and the organic matter was burnt out, and a sufficient optical characterization was obtained as a color cathode-ray tube anode.

Thus obtained phosphor plane was free from dropout of phosphor, lack of hiding, lack and other defects because exposure and development were not repeated as in the conventional wet process, and the phosphor plane of high quality was obtained. Besides, by forming the phosphor plane by continuous printing of black matrix and phosphor pattern, and also by transferring of aluminum thin film having multiple pores before firing, instead of forming vacuum deposition film as metal-backed layer, the procedure is simplified, and the number of steps is decreased. Still more, the phosphor is free from deterioration due to chrome ions such as ammonium dichromate, and a pattern of uniform thickness of 10 to 12 μm which is said to be an ideal film thickness for the phosphor is obtained, so that a cathode-ray tube of about 10% brighter as compared with the prior art is realized. The phosphor plane obtained in this manner was satisfactory as the anode for cathode-ray tube or plasma display.

It is another feature of the ink of the invention that deterioration of degree of vacuum due to worsening of the scattering performance may be prevented even if fired by covering the black matrix and phosphor layer with aluminum thin film possessing multiple pores before firing, instead of forming the vacuum deposition film as metal-backed layer after ink printing and firing, so that the process may be further simplified.

FIG. 2 shows a curve 201 of the amount of exhaust gas (40° C., 1 hour) from the formed cathode-ray tube anode, in terms of the ratio of polymerization of iso-butyl methacrylate and α-methyl styrene. Generally, the degree of vacuum applicable as the cathode-ray tube anode is in the order to $10^{-7}$ to $10^{-6}$, and as known from the diagram, α-methyl styrene was 5 to 20 wt. % in the region where the amount of the exhaust gas was in the order of $10^{-6}$.

Figure 3:
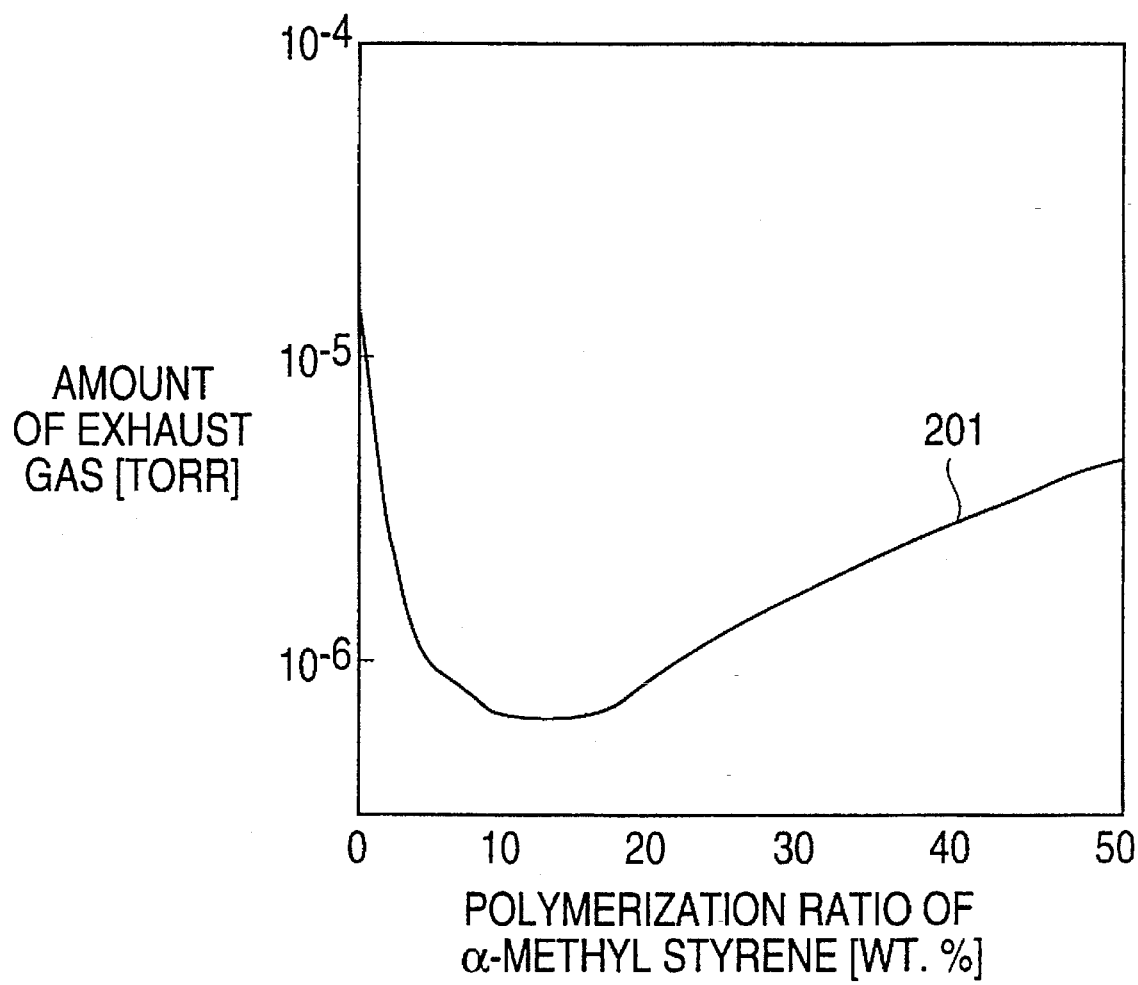
FIG. 3 is a diagram of the amount of exhaust gas expressing the exhaust gas amount curve 301 from the cathode-ray tube anode being formed with respect to the ratio of polymerization of iso-butyl methacrylate and α-methyl styrene.

FIG. 3 is a transfer amount diagram showing the transfer amount curve 301 of the phosphor ink to the transfer object, together with the organic solvent/phosphor powder amount ratio (by weight) when the phosphor powder and organic solvent in Example 2 are used. At this time, the region of the largest transfer amount was the region of the organic solvent/phosphor powder ratio (by weight) of 0.15 to 0.30. Similarly, the organic solvent/graphite powder amount ratio (by weight) of the graphite ink was 1.2 to 1.6.

Figure 4:
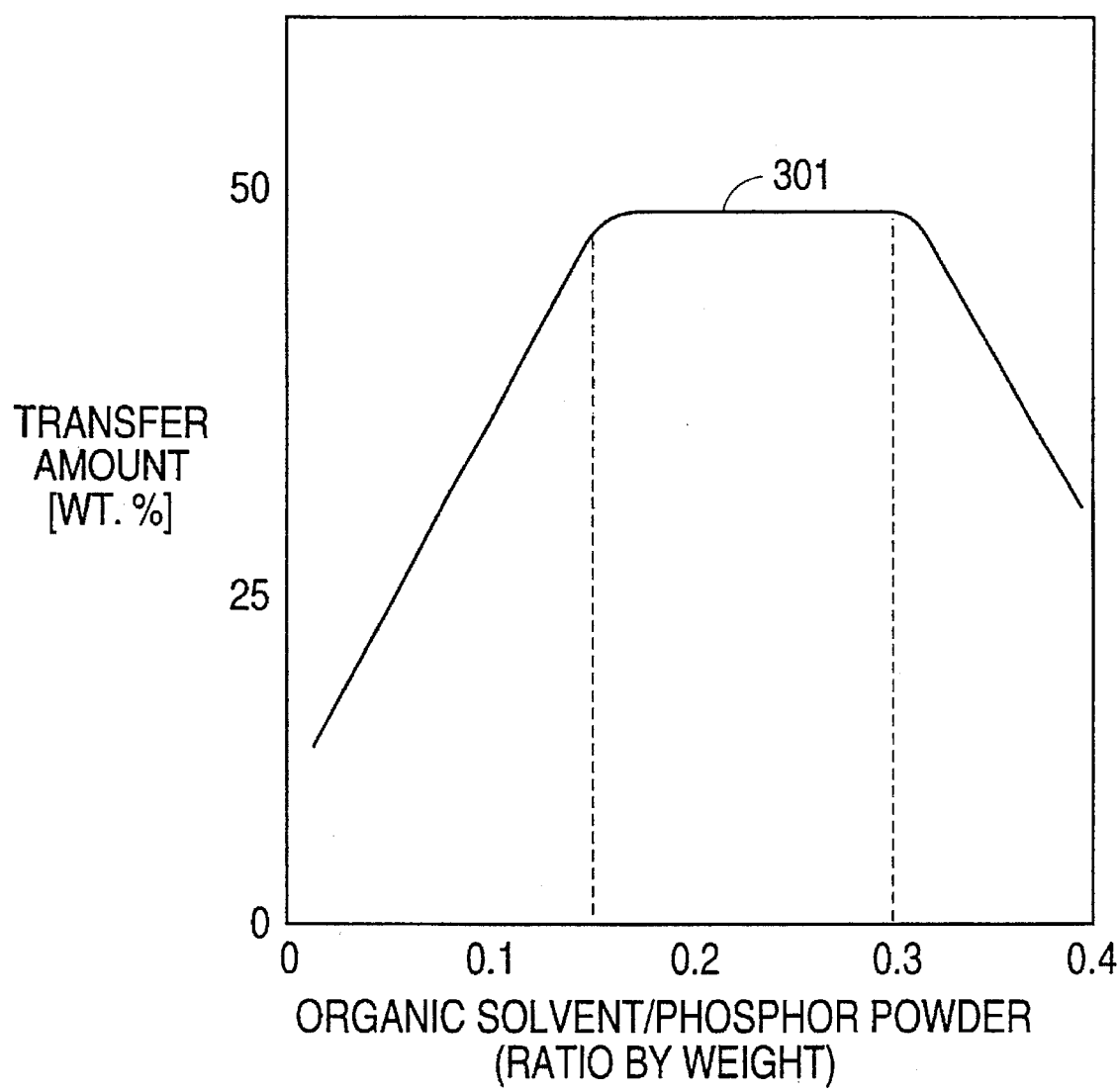
FIG. 4 is a transfer amount diagram expressing the transfer amount curve 401 of the phosphor ink to the transfer object, together with the organic solvent/phosphor powder ratio (by weight)
Figure 5:
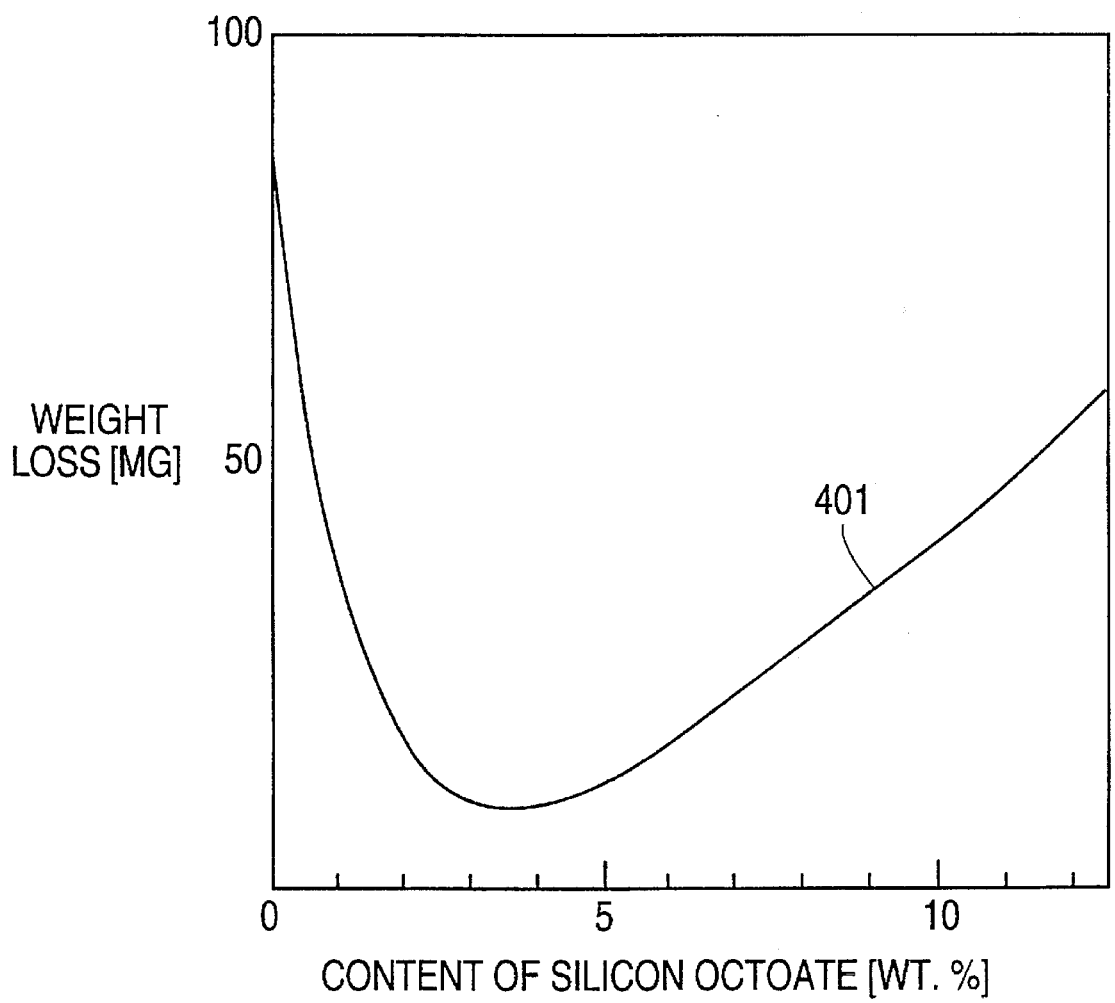
FIG. 5 is a weight loss diagram expressing the weight loss curve 501 showing the relation between the weight loss right after firing by cleaning and drying the cathode-ray tube anode (25 cm$^2$), and the content of silicon octoate in the graphite ink.

FIG. 4 shows the weight loss curve 401 showing the relation between the weight loss immediately after firing and the content of silicone octoate in the graphite ink in the case of washing and drying of cathode-ray tube anode (25 cm$^2$) in running water with water pressure of 0.1 kg/cm$^2$ and water flow of 1200 ml/min. As known from FIG. 4, the weight loss was less at the silicon octoate of 10 to 2 wt. %, and it is known that the adhesive strength is markedly increased. The most preferable content of silicon octoate was 6 to 2 wt. %.

As the resin, meanwhile, in Example 1 and Example 2, a copolymer of iso-butyl methacrylate (iBA) and poly-α-methyl styrene (α-MeSt), and a copolymer of poly-iso-butyl methacrylate (iBMA), polymethyl methacrylate and poly-α-methyl styrene (α-MeSt) were used, but individual monomers may be also used.

In general acrylic resin (for example, n-butyl methacrylate), however, the scattering performance was poor, and it was not practicable. In addition, it is also possible to use polytetrafluoroethylene or polybutene. This is possible, of course, in consideration of the miscibility of resins and dissolution amount into the solvent. Furthermore, to improve the dispersion of the pigment, glycidyl methacrylate or the like may be copolymerized within 5%. In the resin, however, it is required to contain α-methyl styrene by at least 5 to 20 wt. % and out of this range or with the acrylic resin alone, the scattering performance of the resin is poor, and the degree of vacuum of the formed cathode-ray tube deteriorates. Incidentally, if the average molecular weight of the resin is more than 100,000, the ink viscosity becomes high, which is not suited to printing, or if less than 1000, the scattering performance in firing is worse. That is, the average molecular weight of the resin should be preferably at 100,000 to 1,000 or more preferably 10,000 to 1,000.

As the organic solvent, in Example 1 and Example 3, butylcarbitol acetate was used, and α-terpineol in Example 2, but these are not limitative, and butylcarbitol, 2,2,4-trimethyl-1-3-hydroxybentyl isobutylate, and ethyleneglycol monophenyl ether may be used either alone or in combination, which may be selected depending on the printing condition and drying condition.

As the organic acid metal salt in the graphite ink, silicon octoate was used in Example 1 and Example 2, but it is not limitative, and as the organic acid metal salt, at least one of silicon octoate, aluminum octoate, tin octoate and zinc octoate, or at least one of silicon neodecanoate, aluminum neodecanoate, tin neodecanoate and zinc neodecanoate may be used, and the contents of these organic acid metal salts may be preferably 10 to 2 wt. % in consideration of the scattering performance of the resin, and the most preferable content is 6 to 2 wt. %. As the graphite powder, in Example 1 and Example 2, powder with average particle size of 0.4 μm was used, but the average particle size may be sufficient in a range of 0.2 to 1.0 μm. As the phosphor powder, in Example 1 and Example 2, the average particle size of 5.2 μm is used, but this value is not limitative, and the average particle size of 2.0 to 15.0 μm is applicable. In Example 2, red, green and blue phosphor powders were used, but as the blue luminescent phosphor, either the pigmented phosphor combined with blue pigment, such as cobalt blue pigment, or the phosphor alone may be used. Likewise as the green luminescent phosphor, either the pigmented phosphor combined with green pigment, such as chromium oxide pigment, or the phosphor alone may be used. As the phosphor powder, as far as it is applicable to phosphor for television, display, projection tube and special tube or the like, for example, not only $Y_2O_2S$:Eu phosphor stated above, but also $Y_2O_3$:Eu, $YVO_4$:Eu, CaS:Eu or the like may be used as the red luminescent phosphor, $Zn_2SiO_4$:Mn, As, $(Y, Gd)_2O_2S$:Tb, $InBO_3$:Tb, $Y_2SiO_5$:Tb, LaOCl:Tb or the like as the green luminescent phosphor, $Y_2SiO_5$:Ce, $(SrCaBa)_5 (PO_4)_3Cl$:Eu or the like as the blue luminescent phosphor, and $InBO_3$:Eu or the like as the orange luminescent phosphor.

EXAMPLE 3

An embodiment of color filter of liquid crystal is demonstrated below as a pattern product.

In the following composition, by passing five times in a three roll mill to mix, a red ink of color filter for liquid crystal was prepared.

| | |
|---|---|
| Oligoester acrylate (Toa Gosei Co.) | 50 (parts by weight) |
| Vinyl ester (Showa Polymer Co.) | 30 |
| Dispersing agnet (ICI, Japan) | 2 |
| Pigment, red (Ciba Geigy) | 11 |
| Pigment, yellow (Sanyo Pigment Co.) | 2 |
| Hardening agent (Mark Co.) | 5 |

In the same manner as above, blue ink and green ink were also prepared by using different pigments.

On a glass substrate, an ultraviolet setting resin (Goselac, Nippon Gosei Kagaku Co.) was formed. Using the inks for color filter in the composition above, after printing in the conditions of gravure intaglio (width 120 μm, depth 15 μm) and blanket (silicone rubber hardness 45 degrees, rubber thickness 8 mm), ultraviolet rays were emitted to cure, and a pattern with excellent linearity of 100 μm was obtained. These patterns of three colors were excellent as the color filter for liquid crystal.

What is claimed is:

1. A method of forming a pattern of an ink layer on a glass substrate comprising the steps of:

forming a tacky layer on said glass substrate;

forming a pattern of an ink on a surface of a blanket whose surface is covered with an elastic material; and transferring said pattern of the ink on said blanket onto said tacky layer formed on said glass substrate.

2. The method according to claim 1, wherein said tacky layer is made of a resin having a glass transition point of 40° C. or less.

3. The method according to claim 1, wherein said tacky layer is an ultraviolet setting resin.

4. The method according to claim 1, wherein said tacky layer is a thermoplastic resin, said thermoplastic resin being heated in the step of transferring said pattern on said blanket onto said tacky layer.

5. The method according to claim 1, wherein the step of forming a pattern of an ink on the surface of said blanket comprises the steps of: forming a pattern of an ink on an intaglio by filling a pattern of grooves formed on said intaglio; and transferring the pattern of the ink on said intaglio onto the surface of said blanket.

6. The method according to claim 1, further comprising the steps of firing the substrate having thereon said tacky layer onto which said pattern of the ink has been transferred.

7. A method of forming a phosphor pattern on a glass substrate comprising the steps of:

forming a tacky layer on said glass substrate;

filling a pattern of grooves formed on an intaglio with a mixture of at least a photo-absorbent powder and an ink mainly composed of a resin which is removable by pyrolysis or combustion to form a pattern of the mixture on said intaglio;

transferring said pattern of the mixture on said intaglio onto a surface of a blanket whose surface is covered with an elastic material to form a pattern of the mixture on said blanket;

forming a pattern of a phosphor layer on said photo-absorbing pattern; and firing said glass substrate.

8. A method of forming a phosphor pattern on a glass substrate comprising the steps of:

forming a tacky layer on said glass substrate;

filling a pattern of grooves formed on an intaglio with a mixture of at least a phosphor powder and an ink mainly composed of a resin which is removable by pyrolysis or combustion to form a pattern of the mixture on said intaglio;

transferring said pattern of the mixture on said intaglio onto a surface of a blanket whose surface is covered with an elastic material to form a pattern of the mixture on said blanket;

transferring said pattern of the mixture on said blanket onto said tacky later formed on said glass substrate to form a pattern of the mixture on said tacky layer; and firing said glass substrate.

9. A method of forming a color filter comprising the steps of:

forming a tacky layer on a glass substrate;

filling a pattern of grooves formed on an intaglio with a mixture of at least a color pigment and an ink mainly composed of a resin to form a pattern of the mixture on said intaglio;

transferring said pattern of the mixture on said intaglio onto a surface of a blanket whose surface is covered with an elastic material to form a pattern of the mixture on said blanket; and transferring said pattern of the mixture on said blanket onto said tacky layer formed on said glass substrate to form a pattern of the mixture on said tacky layer to thereby obtain a color filter.

10. The method according to claim 9, wherein said tacky layer is an ultraviolet setting resin layer.

11. A method of forming a cathode-ray tube anode comprising the steps of:

forming a tacky layer on a glass substrate;

forming a pattern of a graphite ink on an intaglio;

transferring said pattern of the graphite ink onto a surface of a blanket whose surface is covered with an elastic material;

transferring said pattern of the graphite ink on said blanket onto said tacky layer formed on said glass substrate to thereby form a black matrix layer;

forming a pattern of a phosphor ink on an intaglio;

transferring said pattern of the phosphor ink onto a surface of a blanket whose surface is covered with an elastic material;

transferring said pattern of the phosphor ink on said blanket onto said glass substrate on which said black matrix layer has been formed to thereby form a phosphor layer;

forming a metal-back layer by covering said black matrix layer and said phosphor layer with an aluminum thin film having formed thereon a plurality of pores; and firing said glass substrate.

12. The method according to claim 11, wherein the step of forming the pattern of the graphite ink on the intaglio comprises a step of filling a pattern of grooves formed on said intaglio with the graphite ink, and the step of forming the pattern of the phosphor ink on the intaglio comprises a step of filling a pattern of grooves formed on said intaglio with the phosphor ink.

13. The method according to claim 12, wherein said elastic material comprises a silicone resin and has a hardness of 30 to 60 degrees.

14. The method according to claim 12, wherein said blanket is pressed at a pressure of 2 to 10 kg/cm² onto said intaglio in each of the steps of transferring the pattern of the graphite ink onto said blanket and transferring the pattern of the phosphor ink onto said blanket, and pressed at a pressure of 2 to 10 kg/cm$^2$ onto said substrate in each of the steps of transferring the pattern of the graphite ink on said blanket onto said tacky layer and transferring the pattern of the phosphor ink on said blanket onto said glass substrate.

15. The method according to claim 11, wherein the firing step is carried out at a firing temperature of 430° to 480° C.

16. The method according to claim 11, wherein said aluminum thin film has a porosity of 3 to 15%.

17. The method according to claim 11, wherein said tacky layer is made of a resin having a glass transition point of 40° C. or less.

18. The method according to claim 11, wherein said tacky layer has a thickness of 1 to 3 μm.

* * * * *